US010733635B1

(12) United States Patent
Rus et al.

(10) Patent No.: US 10,733,635 B1
(45) Date of Patent: *Aug. 4, 2020

(54) AUTOMATIC GENERATION AND MANAGEMENT OF ADVERTISING CAMPAIGNS BASED ON THIRD-PARTY LISTINGS

(71) Applicant: Quantcast Corporation, San Francisco, CA (US)

(72) Inventors: Silvius V. Rus, Orinda, CA (US); Barney Govan, Walnut Creek, CA (US); Nhat Bao Sinh Vu, Palo Alto, CA (US); Mark Cooper, San Francisco, CA (US)

(73) Assignee: Quantcast Corporation, San Jose, CA (US)

( * ) Notice: Subject to any disclaimer, the term of this patent is extended or adjusted under 35 U.S.C. 154(b) by 299 days.

This patent is subject to a terminal disclaimer.

(21) Appl. No.: 15/721,782

(22) Filed: Sep. 30, 2017

Related U.S. Application Data

(63) Continuation of application No. 13/835,248, filed on Mar. 15, 2013, now Pat. No. 9,846,895.

(51) Int. Cl.
*G06Q 30/02* (2012.01)
(52) U.S. Cl.
CPC ............... *G06Q 30/0275* (2013.01)
(58) Field of Classification Search
CPC ................................................. G06Q 30/0275
See application file for complete search history.

(56) References Cited

U.S. PATENT DOCUMENTS

| 7,191,147 B2 | 3/2007 | Heene et al. |
| 9,846,895 B1 * | 12/2017 | Rus ................... G06Q 30/0275 |
| 10,169,765 B2 * | 1/2019 | Kline .................... G06Q 30/02 |

(Continued)

OTHER PUBLICATIONS

Yuan, S., Abidin, A.Z., Sloan, M. and Wang, J., 2012. Internet advertising: An interplay among advertisers, online publishers, ad exchanges and web users. arXiv preprint arXiv:1206.1754.*

(Continued)

*Primary Examiner* — David J Stoltenberg
*Assistant Examiner* — Robert C Johnson
(74) *Attorney, Agent, or Firm* — Robin W. Reasoner; Andrea Wheeler

(57) ABSTRACT

Embodiments are directed to generating and managing an advertising campaign based on a third-party sales listing. In particular, an identifier associated with a sales listing posted over a third-party service from a user of the third-party service is received. Sales listing data for the sales listing is retrieved from the third-party service using the identifier associated with the sales listing. Thereafter, an advertising campaign is automatically generated based at least in part on the retrieved sales listing data. In one aspect, generation of the advertising campaign includes generating an advertising creative using the retrieved sales listing data. Subsequently, bidding on an advertising opportunity in an auction is performed according to the generated advertising campaign. Responsive to winning the auction, an advertisement based on the advertising creative is provided to a content provider associated with the advertising opportunity.

17 Claims, 7 Drawing Sheets

(56) References Cited

U.S. PATENT DOCUMENTS

| | | | | |
|---|---|---|---|---|
| 2004/0254853 | A1* | 12/2004 | Heene | G06Q 30/0253 |
| | | | | 705/14.51 |
| 2006/0155597 | A1* | 7/2006 | Gleason | G06Q 30/02 |
| | | | | 705/14.12 |
| 2007/0214048 | A1* | 9/2007 | Chan | G06O 30/02 |
| | | | | 705/14.69 |
| 2009/0144117 | A1* | 6/2009 | Cavander | G06Q 10/06313 |
| | | | | 705/7.23 |
| 2010/0217665 | A1* | 8/2010 | Sharma | G06Q 30/02 |
| | | | | 705/14.45 |
| 2011/0231264 | A1* | 9/2011 | Dilling | G06Q 30/02 |
| | | | | 705/14.71 |
| 2011/0246298 | A1* | 10/2011 | Williams | G06Q 30/0275 |
| | | | | 705/14.53 |
| 2014/0074627 | A1* | 3/2014 | Kucharz | G06Q 30/02 |
| | | | | 705/14.72 |

OTHER PUBLICATIONS

Evans, D.S., 2009. The online advertising industry: Economics, evolution, and privacy. Journal of economic perspectives, 23(3), pp. 37-60.*

U.S. Office Action, U.S. Appl. No. 13/835,248, dated Jan. 5, 2017, 11 pages.

U.S. Office Action, U.S. Appl. No. 13/835,248, dated Oct. 2, 2015, 28 pages.

U.S. Office Action, U.S. Appl. No. 13/835,248, dated Mar. 26, 2015, 23 pages.

* cited by examiner

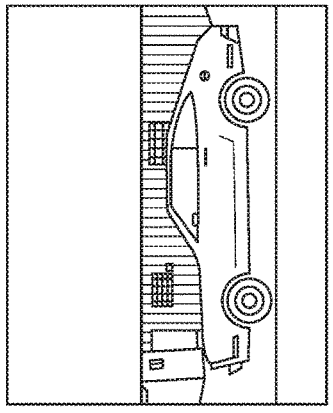

AUTOMATIC GENERATION AND MANAGEMENT OF ADVERTISING CAMPAIGNS BASED ON THIRD-PARTY LISTINGS

CROSS-REFERENCE TO RELATED APPLICATIONS

This application is a continuation of U.S. Non-Provisional application Ser. No. 13/835,248 entitled Automatic Generation and Management of Advertising Campaigns Based on Third-Party Listings by Silvius V. Rus, Barney Govan, Nhat Bao Sinh Vu and Mark Cooper, filed on Mar. 15, 2013, which is hereby incorporated by reference in its entirety.

BACKGROUND

1. Technical Field

This invention pertains to advertising, and in particular to generating and managing advertising campaigns based on third-party sales listings.

2. Description of Related Art

Many advertisers promote their goods and services through online advertising campaigns. Currently, most online advertising campaigns are generated by institutional advertisers (e.g., companies). Such is the case because generating the advertising campaigns requires definition of various campaign parameters (e.g., targeting parameters) and creation of advertisements in accordance with the requirements of various advertising exchange systems. Thus, generating an advertising campaign often requires significant time and advertising knowledge. For an institutional advertiser, developing an advertising campaign is often worthwhile since the advertiser frequently wishes to promote the sale of relatively large volumes of goods and/or services. Thus, the cost (in terms of time) to develop an advertising campaign may be minor in comparison to the potential revenue generated from the sale of the advertiser's goods and services.

In contrast, for people selling goods and services on a smaller scale (e.g., selling an individual good every few months), taking the time and effort to develop advertising campaigns may not be worthwhile. Such is the case because the cost of developing an advertising campaign may be too large in comparison to the potential revenue generated from the sale of such goods and services. As a result, advertising opportunities with respect to smaller scale sales are regularly lost, which adversely impacts the price at which smaller scale sellers are able to sell their goods and services. Thus, what is needed is a way for smaller scale sellers to quickly and easily generate advertising campaigns for their goods and services.

SUMMARY

Embodiments of the invention include a method, a non-transitory computer readable storage medium and a system for generating and managing advertising campaigns based on third-party sales listings. Embodiments of the method include receiving an identifier associated with a sales listing posted over a third-party service from a user of the third-party service. Sales listing data for the sales listing is retrieved from the third-party service using the identifier associated with the sales listing. Thereafter, an advertising campaign is automatically generated based at least in part on the retrieved sales listing data. In one aspect, generation of the advertising campaign includes generating an advertising creative using the retrieved sales listing data. Subsequently, bidding on an advertising opportunity in an auction is performed according to the generated advertising campaign. Responsive to winning the auction, an advertisement based on the advertising creative is provided to a content provider associated with the advertising opportunity.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 5C is an example graphical user interface providing details regarding a generated advertising campaign according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
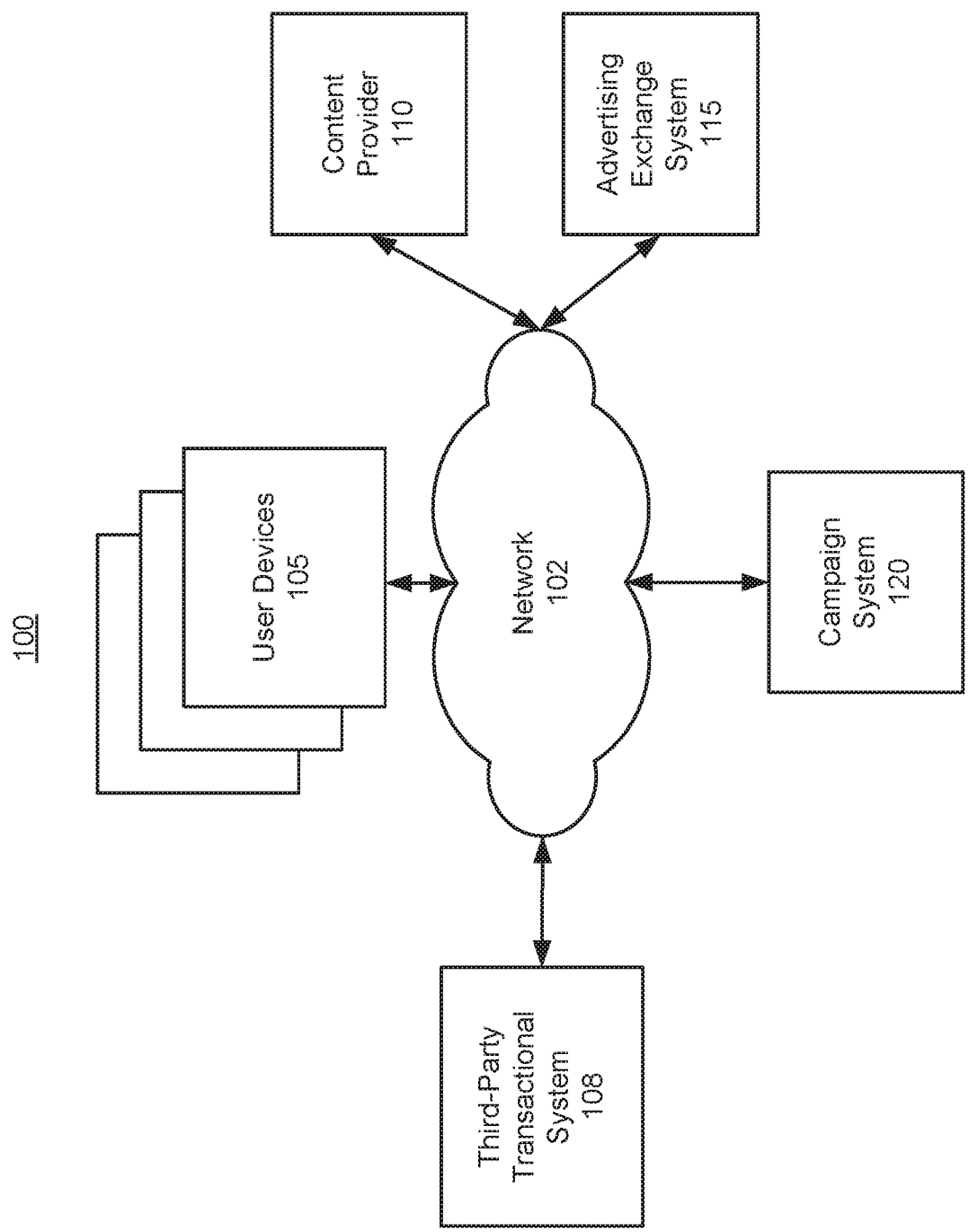
FIG. 1 is a high-level block diagram of a computing environment for generating and managing an advertising campaign based on a third-party sales listing according to one embodiment.

FIG. 1 is a high-level block diagram of a computing environment 100 for generating and managing an advertising campaign based on a third-party sales listing according to one embodiment. As shown in FIG. 1, the computing environment 100 includes user devices 105, a third-party transactional system 108, a content provider 110, an advertising exchange system 115, and a campaign system 120 communicating with one another via the network 102.

The network 102 enables communications between the user devices 105, the third-party transactional system 108, the content provider 110, the advertising exchange system 115, and the campaign system 120. In one embodiment, the network 102 uses standard communications technologies and/or protocols, and may comprise the Internet. Thus, the network 102 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 102 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 102 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The user devices 105 are electronic devices used by users to initiate advertising campaigns with the campaign system 120 via the network 102. The user devices 105 may also be used to communicate with other entities via the network 102. For example, a user device 105 may be used to view content provided by the content provider 110, and/or view third-party sales listing posted by the third-party transactional system 108. In one aspect, each of the user devices 105 may be a suitable computing device. For example, an individual user device 105 may be a desktop computer system, laptop, workstation, or server. An individual user device 105 may additionally or alternatively be a mobile computing device, such as a smartphone, tablet device, portable gaming device, e-reading device, personal digital assistant (PDA), etc. In one aspect, the user devices 105 each execute a suitable operating system, such as ANDROID, APPLE iOS, a MICROSOFT WINDOWS-compatible operating system, APPLE OS X, UNIX, and/or a LINUX distribution. The user device 105 may further execute suitable software applications, such as a web browser (e.g., GOOGLE CHROME, MICROSOFT INTERNET EXPLORER, APPLE SAFARI, MOZILLA FIREFOX, etc.), a native application (e.g., MICROSOFT WORD for the WINDOWS 8 Operating System), etc.

The third-party transactional system 108 is a third-party sales channel which enables users to sell goods and services over the network 102. Examples of the third-party transactional system 108 can include auction websites, rental websites, classified websites, or any other website usable by an individual user to sell goods or services. In some embodiments, the third-party transactional system 108 generates and posts (e.g., makes accessible via a network) various third-party sales listings. The third-party sales listing may each offer to sell one or more items (i.e., goods or services). Users may access the third-party transaction system 108 via the user devices 105 to view the third-party sales listings. The users may additionally purchase and/or bid on the items offered by the third-party sales listings.

To generate an individual third-party sales listing, the third-party transactional system 108 receives a request from a user to sell an item. The request may include various parameters, such as item details, a starting price, an end date, an item category, item sub-categories, etc. In one aspect, the third-party transactional system 108 may enforce certain requirements for the parameters received from the user. For example, the third-party transactional system 108 may require that certain parameters be received in a particular format. The third-party transactional system 108 may additionally require that certain parameters be limited to particular parameter types (e.g., the third-party transactional system 108 may restrict classification of a third-party sales listing to one of a set of predefined categories). After receiving the parameters, the third-party transactional system 108 stores the parameters as a set of structured and/or semi-structured data. As used herein, structured and/or semi-structured data may be any information wholly or partially formatted and/or generated according to a suitable set of rules or criteria. The third-party transactional system 108 additionally generates and posts a third-party sales listing using the received parameters.

In one embodiment, the third-party transactional system 108 may additionally provide a button or some other mechanism that enables a user that is responsible for a third-party sales listing to have an advertising campaign automatically generated by the campaign system 120. In one embodiment, the third-party transactional system 108 additionally includes an application programming interface (API) or some other suitable mechanism for enabling the campaign system 120 to access data for the third-party sales listing. As will be discussed, such data may be leveraged by the campaign system 120 to generate the advertising campaign for the third-party sales listing.

The content provider 110 is a media channel which provides content over the network 102 to a user device 105. Examples of content providers 110 can include website operators and cable television operators. In some cases, it can be useful to consider a content provider as comprising multiple content providers. For example, a content provider such as a portal website operator can provide multiple websites, such as localized versions of the same website. Examples of the content provided by the content providers 110 can include, but are not limited to, a webpage, a portion of an online video clip, a portion of a networked television program, a portion of a cable television program, a portion of a satellite television program, a portion of an Internet Protocol (IP) television program, a portion of an online audio clip, the results of a keyword search from an online search engine, the results of a request for directions from an online mapping service, advertisement content, interfaces for making online purchases and interfaces for checking a credit card account balance. In some examples, the content can be provided over the network 102 responsive to a request to a content provider 110. In other examples, a content provider 110 can push content over the network 102 to a user device 105. In some embodiments, the content provider 110 may request advertising from the advertising exchange system 115. Responsive to the request, the content provider 110 may receive an advertisement for presentation.

The advertising exchange system 115 is an electronic marketplace for buying and selling advertising impressions over the network 102. In an example, the advertising exchange system 115 can support the rapid auction of advertising impressions as they become available. For example, the advertising exchange system 115 can be notified by the content provider 110 after a user of a user device 105 requests content from the content provider 110 and an opportunity to display advertising to that user becomes available. The advertising exchange system 115 then provides information regarding the opportunity to multiple advertising entities, such as the campaign system 120. Such information may include, among other data, an advertising category of the opportunity. The advertising category may, at a high-level, provide information regarding the topic of the content of the content provider 110 associated with the opportunity. Responsive to providing the information, the advertising exchange system 115 receives bids related to the opportunity from the advertising entities, selects a winning bid and enables the winning advertising entity to have its advertisements presented to the user.

The campaign system 120 generates and manages advertising campaigns over the network 102. In one embodiment, the campaign system 120 receives a request to initiate an advertising campaign. The request may be received from a user of the third-party transactional system 108 that is responsible for an active third-party sales listing posted over the third-party transactional system 108. For example, the request may be received from a particular user responsible for an auction being held over the third-party transactional system 108. Upon receiving the request, the campaign system 120 retrieves structured and/or semi-structured data associated with the active third-party sales listing from the third-party transactional system 108.

Using the structured and/or semi-structured data, the campaign system 120 automatically generates an advertising campaign for the active third-party sales listing. In particular, the campaign system 120 may use the data to determine targeting parameters, an estimated reach, a recommend campaign budget, and/or other information for the advertising campaign. The campaign system 120 may additionally generate an advertising creative for the advertising campaign using the data.

After generating the advertising campaign, the campaign system 120 provides information regarding the advertising campaign to the responsible user. For example, the campaign system 120 presents the advertising creative generated for the advertising campaign to the responsible user. Responsive to an approval to proceed with the advertising campaign, the campaign system 120 executes the advertising campaign. For example, the campaign system 120 may bid on advertising impressions auctioned by the advertising exchange system 115. Responsive to a winning bid for an advertising impression, the campaign system 120 provides an advertisement based on the generated advertising creative to the content provider 110 associated with the advertising impression.

By generating and managing advertising campaigns in the manner described, the campaign system 120 enables users of third-party transactional systems to quickly and easily initiate advertising campaigns. In particular, the campaign system 120 automatically generates advertising campaigns by retrieving and processing structured and/or semi-structured data associated with active third-party sales listings. As a result, users of third-party transactional systems no longer need to spend significant time and effort developing advertising campaigns for their third-party sales listings. For example, users no longer need to manually develop advertising creatives, input targeting parameters, etc. in order to generate an advertising campaigns for their third-party sales listings. Hence, such users (particularly those selling goods and services on smaller scales) may be more inclined to generate advertising campaigns. As a result, traffic to the users' third-party sales listings posted over the third-party transactional system 108 may increase and lead to higher sale prices for the goods and services offered by the third-party sales listings.

It will be appreciated that while only three user devices 105, one third-party transactional system 108, one content provider 110, one advertising exchange system 115, and one campaign system 120 are shown in FIG. 1, those of skill in the art will recognize that typical environments can have hundreds, thousands, millions, or even billions of any of the aforementioned entities. Furthermore, while the environment 100 shows the campaign system 120 and the advertising exchange system 115 as separate entities, some embodiments may combine one or more functionalities of the campaign system 120 and the advertising exchange system 115 into the same entity.

System Architecture

Figure 2:
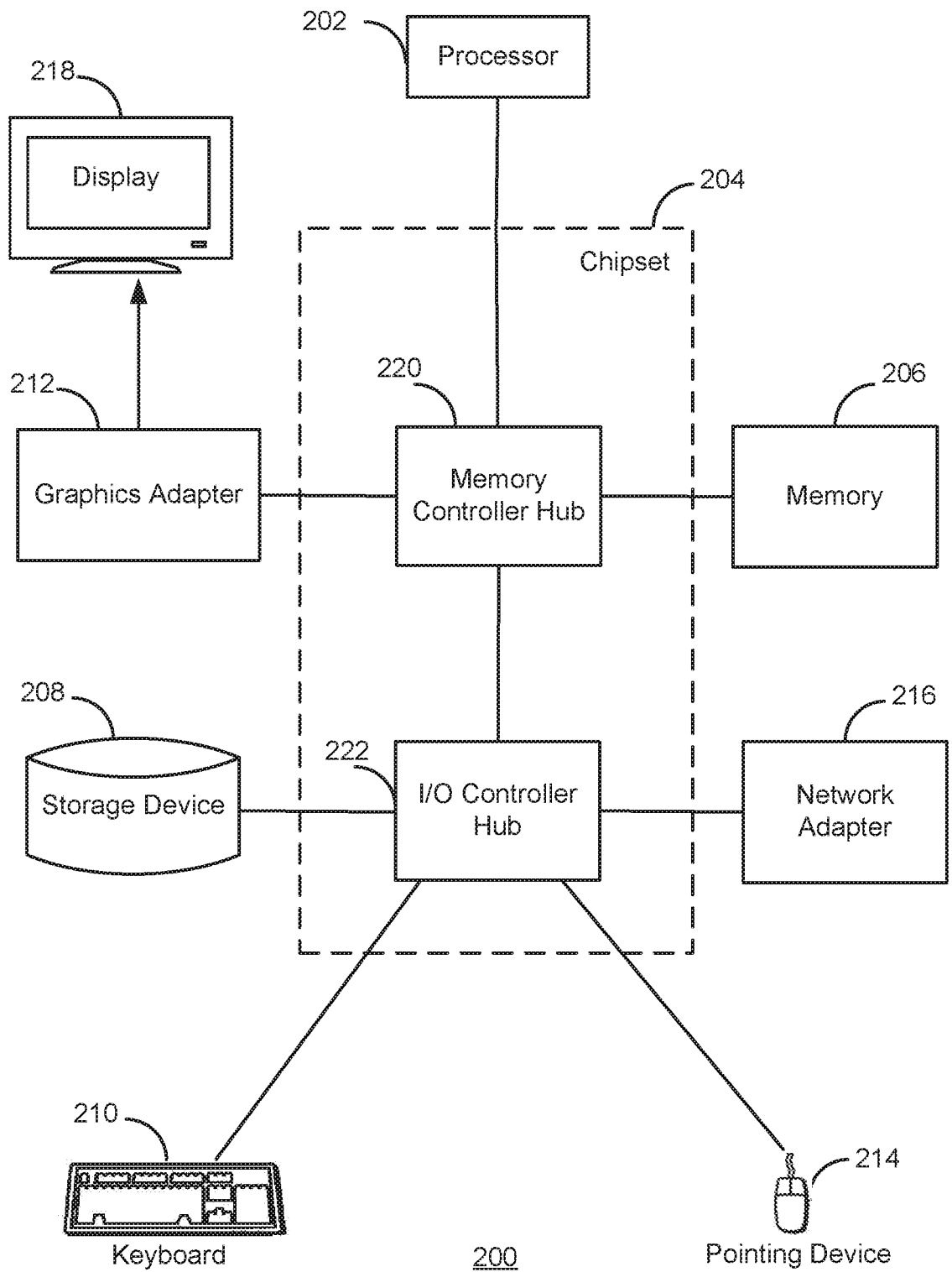
FIG. 2 is a high-level block diagram of a computer system for generating and managing an advertising campaign according to one embodiment.

FIG. 2 is a high-level block diagram of a computer 200 for use as the user devices 105, the third-party transactional system 108, the content provider 110, the advertising exchange system 115, and the campaign system 120 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of to the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 102.

As is known in the art, a computer 200 can have different and/or other components than those shown in FIG. 2. In addition, the computer 200 can lack certain illustrated components. In one embodiment, a computer 200 acting as the distributed system 110 is formed of multiple spatially and/or time distributed blade computers and lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Campaign System Overview

Figure 3:
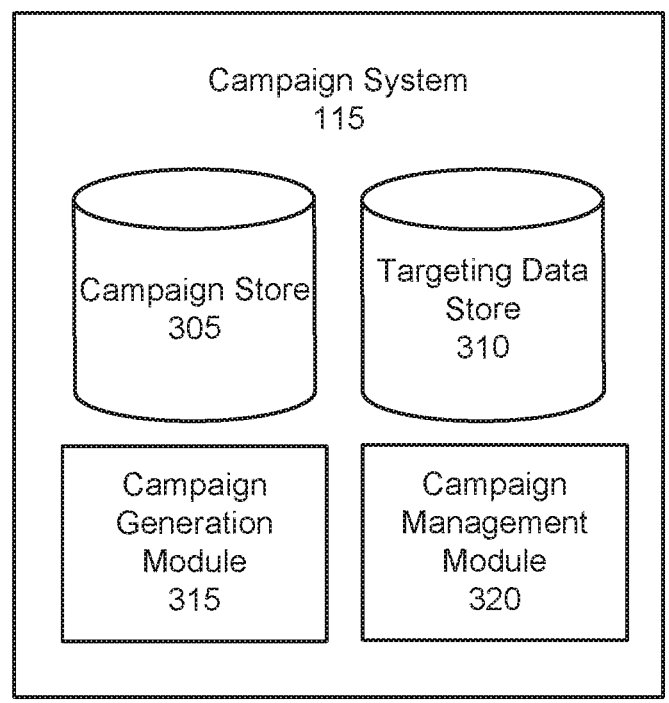
FIG. 3 is a high-level block diagram illustrating a detailed view of modules within a campaign system according to one embodiment.

FIG. 3 is a high-level block diagram illustrating a detailed view of modules within the campaign system 120 according to one embodiment. Some embodiments of the campaign system 120 have different and/or other modules than the ones described herein. Similarly, the functions can be distributed among the modules in accordance with other embodiments in a different manner than is described here. Likewise, the functions can be performed by other entities.

The campaign store 305 stores advertising campaigns generated by the campaign generation module 315. In particular, the campaign store 305 stores at least campaign data, targeting parameter information, and advertising creatives for each advertising campaign. The campaign data may be any suitable information usable for managing an advertising campaign. In one aspect, the campaign data includes at least information regarding a time period during which the advertising campaign is to be operated and a monetary amount to be spent for the advertising campaign. For example, the campaign data may indicate that the advertising campaign is to last no longer than 4 days and that the advertising campaign has a budget of $500.

The targeting parameter information includes data regarding a target audience for an advertising campaign. For example, the targeting parameter information may indicate that the advertisements of a particular advertising campaign are to be targeted at users who visit a particular category or type of website. Illustratively, the targeting parameter information may indicate that the advertising campaign is to be targeted at users who visit websites related to lawn and garden topics. As another example, the targeting parameter information may indicate a strong preference for advertisements of a particular advertising campaign to be targeted at users who are college graduates and interested in horseback riding. In one embodiment, the targeting parameter information for an advertising campaign may be based on the third-party sales listing with which the advertising campaign is associated.

The advertising creatives are usable for generating one or more advertisements for the advertising campaign. In one aspect, an individual advertising creative includes information specifying the advertising content to be included in an advertisement as well as the formatting (e.g., positioning, size, type, etc.) of the advertising content. In one embodiment, the advertising content for an advertising creative leverages at least some of the data of the third-party sales listing with which the advertising campaign is associated. For example, the advertising content may include a price for an item being offered by the third-party sales listing, information about the geographic location of the item, and a description for the item obtained from the data of the third-party sales listing. The advertising content may further include images (e.g., digital pictures), audio, video, or any other suitable media obtained from the data of the third-party sales listing. In one embodiment, an advertising creative may moreover be associated with one or more universal resource identifiers (e.g., hyperlinks) or other linking mechanisms usable for accessing (e.g., viewing) the third-party sales listing.

The targeting data store 310 stores any suitable data usable for generating targeting parameters for an advertising campaign. In one embodiment, the targeting data store 310 stores at least consumption histories and attribute values corresponding to various anonymous consumption entities. As used herein, a consumption entity may be an individual user, a set of users, a user device, a set of user devices, a household, a set of households, or any suitable combination thereof. In one aspect, each consumption entity may be associated with a unique consumption entity identifier (e.g., a unique code or number). The unique consumption entity identifier may, in turn, be associated with the one or more consumption histories and/or one or more attribute values corresponding to the consumption entity. In one aspect, the unique consumption entity identifier may not be associated with the personal information of its associated consumption entity (e.g., a name, a home address, etc.). As such, the personal identity of the associated consumption entity cannot be determined. Hence, the associated consumption entity can remain anonymous.

In one aspect, an individual consumption history of a consumption entity documents one or more media consumption events of the consumption entity. A particular media consumption event records one or more acts associated with accessing content over a network, such as, but not limited to, accessing a web page, spending a particular amount of time viewing a web page, playing of a video clip, pausing of a video clip, using particular hardware/software settings to consume content, and/or other interactions. A particular media consumption event can also record one or more conversion events, such as the initiation of a purchase transaction following viewing of an advertisement. In one aspect, a particular media consumption event additionally includes a content descriptor usable for identifying the content that was accessed as part of the event. Additional information, such as a referring web page and/or search terms used to locate the accessed content can also be included.

The attribute values can comprise of known, collected, received, cross-referenced, inferred, estimated, processed and calculated information related to various entities, which may not be part of a consumption history. In some cases, attribute values can be derived from a consumption history. The estimated household size associated with a consumption entity and the average household income for the zip code associated with a consumption entity are examples of attribute values. In some cases, attribute values can be assessed or described using probabilities. For example, an attribute value can reflect that there is a 90% chance that the household income related to a consumption entity is between $75,000 and $100,000 per year.

The data stored by the targeting data store 310 may additionally include various advertising mappings. The advertising mappings may map particular categories and/or sub-categories of different types of third-party sales listings with various advertising categories of the advertising exchange system 115. For example, a particular auction type sales listing may include an "automobile" category. A mapping stored by the targeting data store 310 may map the category to a "transportation" advertising category of the advertising exchange system 115. As will be discussed, such mappings may be used to generate targeting parameters for an advertising campaign. The data stored by the targeting data store 310 may moreover include a listing of keywords.

The listing of keywords may indicate terms of a third-party sales listing that are usable for determining targeting parameters for the third-party sales listing.

The data stored by the targeting data store 310 may be obtained in any suitable manner and from any suitable source. For example, the data may be obtained from the advertising exchange system 115, the user devices 105, the third-party transactional system 108, the content provider 110, and/or the like. Illustratively, the campaign system 120 may receive, from the content provider 110, information describing a consumption event and an identifier for a consumption entity associated with the consumption event. Based on the information and identifier, the campaign system 120 adds the consumption event to the consumption history of the consumption entity.

The campaign generation module 315 generates an advertising campaign based on a third-party sales listing. In particular, the campaign generation module 315 may receive a campaign request from a user of a user device 105 to initiate an advertising campaign based on a third-party sales listing posted over the third-party transaction system 108. The request may be directly received from the user device 105 or relayed by the third-party transactional system 108. In one aspect, the campaign request includes at least an identifier for the third-party transactional system 108, an identifier for the third-party sales listing on which the advertising campaign is to be based, and/or any other suitable information. For example, the campaign request may indicate a domain name or internet protocol (IP) address for the third-party transactional system 108 and a unique code for the third-party sales listing.

Based on the campaign request, the campaign generation module 315 obtains information for the third-party sales listing from the third-party transactional system 108. For example, using the identifier for the third-party transactional system 108, the campaign generation module 315 identifies the third-party transactional system 108. Thereafter, the campaign generation module 315 accesses an application programming interface (API) of the third-party transactional system 108 using the identifier for the third-party sales listing to retrieve data for the third-party sales listing. The data for the third-party sales listing may include any suitable information, such as a title for the third-party sales listing, a description regarding the item being offered for sale as part of the third-party sales listing, location information for the item being offered for sale as part of the third-party sales listing, shipping information for the item being offered for sale as part of the third-party sales listing, an end date for the third-party sales listing, categories and/or sub-categories of the third-party sales listing, information regarding accepted payment methods, media included in the third-party sales listing (e.g., images, audio, video, etc.), a number of offers or bids currently associated with the third-party sales listing, etc.

Based on the data for the third-party sales listing, the campaign generation module 315 generates an advertising campaign for the third-party sales listing. As part of the generation of the advertising campaign, the campaign generation module 315 determines a set of targeting parameters for the advertising campaign. To determine the targeting parameters, the campaign generation module 315 processes at least some of the data stored in the targeting data store 310 and the retrieved data for the third-party sales listing.

To determine the targeting parameters, in one example, the campaign generation module 315 identifies one or more categories and/or sub-categories indicated by the data for the third-party sales listing. The campaign generation module 315 additionally retrieves mappings associated with the third-party sales listing from the targeting data store 310. Based on the mappings, various advertising categories of the advertising exchange system 115 corresponding to the categories and/or sub-categories of the third-party sales listing are selected. The selected categories may thereafter be used as targeting parameters for the advertising campaign.

As a specific example, the data for the third-party sales listing may indicate that the third-party sales listing is associated with an "automobile" category. Based on such information, the campaign generation module 315 uses various mappings to determine a mapping between the "automobile" category of the third-party sales listing with a "transportation" advertising category of the advertising exchange system 115. Thus, the campaign generation module 315 may include a targeting parameter indicating that advertisements of the advertising campaign are to be targeted at users who have visited websites associated with the "transportation" category of the advertising exchange system 115.

To generate targeting parameters, in another example, the campaign generation module 315 identifies one or more keywords from the data of the third-party sales listing. The keywords may be used to determine the targeting parameters for the advertising campaign. The campaign generation module 315 may identify the keywords in any suitable manner. For example, the campaign generation module 315 may identify keywords by referencing the listing of keywords stored by the targeting data store 310. For example, the data for the third-party sales listing may include the terms HONDA and ACCORD. The listing of keywords may indicate that HONDA and ACCORD are suitable keywords. Thus, the campaign generation module 315 identifies HONDA and ACCORD as keywords for the third-party sales listing.

In the embodiment, the campaign generation module 315 identifies a set of consumption histories and/or attribute values determined to be relevant to the identified keywords. The campaign generation module 315 may determine the set of consumption histories and/or attribute values in any suitable manner. For example, for one or more anonymous entities, the campaign generation module 315 determines whether at least one of the identified keywords are included and/or used greater than a threshold number of times in the consumption history and/or attribute values corresponding to the anonymous consumption entity. If at least one of the keywords is included in and/or is used greater than a threshold number times, the campaign generation module 315 selects the consumption history and/or attribute values of the anonymous consumption entity for additional processing.

In one aspect, the campaign generation module 315 processes and analyzes the selected consumption histories and/or attribute values to determine the targeting parameters for the advertising campaign. Illustratively, the campaign generation module 315 may analyze the selected consumption histories and/or attribute values to correlate a set of general characteristics with the anonymous consumption entities associated with the consumption histories and/or attribute values. Specifically, the campaign generation module 315 may determine various advertising exchange categories, demographics, interests, website visit rates, conversion rates, etc. associated with the anonymous consumption entities. Such characteristics may then used as the targeting parameters for the advertising campaign.

As a specific example, the data for a third-party sales listing may include the keywords "graphics processing unit." For each unique consumption entity identifier, the campaign generation module 315 determines whether the keywords "graphics processing unit" are included in the consumption history and/or attribute values corresponding to the identifier. If the keywords are included in the consumption history and/or attribute values, the campaign generation module 315 selects the consumption history and/or attribute values corresponding to the identifier. An analysis is then performed on the total set of selected consumption histories and/or attribute values. The analysis may include, for example, determining an overall educational background, age range breakdown, gender breakdown, etc. based on the selected consumption histories and/or attribute values. In the example, it may be determined that the keywords "graphical processing unit" have a strong correlation with consumption entities that are college graduates and between the ages of 25-35. As a result, the campaign generation module 315 determines that advertisements for an advertising campaign corresponding to the third-party sales listing are to be targeted at college graduates between the ages of 25-35.

In yet another example, the campaign generation module 315 determines targeting parameters based on a location and shipping restrictions indicated in the data of the third-party sales listing. For example, the data for the third-party sales listing may indicate that an item being offered for sale is for "pick up only." Thus, the campaign generation module 315 may determine that the advertisements for a corresponding advertising campaign are to be targeted at users within a threshold distance of the location of the item as indicated by the data of the third-party sales listing. As another example, the data for the third-party sales listing may indicate that an item cannot be shipped outside of the United States. Thus, the campaign generation module 315 may determine that the advertisements for a corresponding advertising campaign are to be targeted at only users within the United States.

In addition to determining targeting parameters, the campaign generation module 315 further determines a reach metric for the advertising campaign. The reach metric may be based on the determined targeting parameters. The reach metric may be an estimate of a total theoretical number of users that may be reached by (e.g., presented with) advertisements of the advertising campaign. In one embodiment, the reach metric may be based on the total number of anonymous consumption entities that match the targeting parameters for the advertising campaign. For example, an advertising campaign may have targeting parameters directed at users who are determined to be interested in baseball and live in Colorado. As such, the campaign generation module 315 analyzes the consumption histories and/or attribute values stored in the targeting data store 310 to determine a number of anonymous consumption entities that are interested in baseball and live in Colorado. Based on the number, the targeting data store 310 estimates a reach metric for the advertising campaign. Illustratively, the campaign generation module 315 may estimate that the advertisements of the advertising campaign may reach 9,000 users based on a number of anonymous entities identified as being a match for the aforementioned targeting parameters.

In one embodiment, if the estimated reach is smaller than a threshold number, the campaign generation module 315 modifies the determined targeting parameters for the advertising campaign. For example, the campaign generation module 315 may broaden the targeting parameters such that the advertisements of the advertising campaign may theoretically reach a larger number of users, where the larger number at least meets the threshold number.

In one embodiment, the campaign generation module 315 may furthermore determine a recommended amount to be used for the advertising campaign. Such a determination may be based on the determined reach metric and the data for the third-party sales listing. For example, a determined reach metric may estimate that 150 people worldwide would be interested in an item offered for sale by the third-party sales listing associated with the advertising campaign being generated. Thus, the campaign generation module 315 may select a proposed amount based on the metric that 150 people worldwide would be interested in the item. As another example, the campaign generation module 315 may limit the proposed amount to be used for advertising to a certain threshold of a determined value of the item being offered by the third-party sales listing. For example, the campaign generation module 315 may determine than an item being offered by the third-party sales listing is likely to be sold for $300. Such a determination may be based on historical sale prices for similar items, based on a "buy" price set by the user responsible for the third-party sales listing, etc. The threshold for the determined value of the item being offered may be 10%. Thus, the campaign generation module 315 may propose an advertising campaign amount that is less than $30.

In one embodiment, the campaign generation module 315 generates an advertising creative for the advertising campaign based on the third-party sales listing. The advertising creative may be used to automatically generate advertisements for presentation to users of the content provider 110. To generate the advertising creative, the campaign generation module 315 selects a suitable advertising creative template. The template may be selected based on the third-party transactional system 108, the third-party sales listing for which the advertising campaign is being generated, and/or the like. For example, the third-party transactional system 108 may be an auction website. Accordingly, the campaign generation module 315 may select an advertising creative template tailored for auction websites. As another example, the third-party sales listing may indicate an association with an "automobile" category. Thus, the campaign generation module 315 may select an advertising creative template specifically geared towards third-party sales listings for automobiles.

After selecting a suitable advertising creative template, the campaign generation module 315 generates an advertising creative by automatically populating various fields of the advertising creative template with the retrieved data for the third-party sales listing. In one embodiment, the advertising creative template may include information mapping the various fields of the template to particular items of data included in the retrieved data for the third-party sales listing. Based on the mapping information, the campaign generation module 315 populates the various fields of the template with corresponding data items included in the retrieved data for the third-party sales listing. For example, a heading field of the advertising creative template may be populated with text included in the title data for the third-party sales listing. Likewise, an image associated with the third-party sales listing may be inserted into a particular position of the advertising creative template.

After generation of the advertising campaign, the campaign generation module 315 provides the advertising campaign to a user responsible for the campaign, such as the user that initiated the request to generate the advertising campaign. As an example, the campaign generation module 315 may provide the advertising creative generated as part of the advertising campaign. The campaign generation module 315 may additionally provide information regarding the recommended amount of money to be spent for the advertising campaign, the estimated reach associated with the advertising campaign, etc. Upon receiving the advertising campaign, the user device 105 may present the advertising campaign to its user via, for example, a display of the user device 105.

In providing the advertising campaign, the campaign generation module 315 enables the user to evaluate, modify, and/or approve the advertising campaign. For example, the campaign generation module 315 may receive updates to the advertising campaign from the user, where the updates modify the text or images included in the advertising creative. The campaign generation module 315 may accordingly modify the advertisement based on the updates. As another example, the campaign generation module 315 may receive a user input indicating an amount to spend on the advertising campaign that is different from the recommended amount.

In one aspect, the campaign generation module 315 receives approval from the user of the user device 105 to initiate the generated advertising campaign. Responsive to receiving approval, the campaign generation module 315 indicates to the campaign management module 320 that the advertising campaign for the third-party sales listing has been approved. The campaign generation module 315 may additionally store the advertising campaign in the campaign store 305.

The campaign management module 320 manages an advertising campaign generated by the campaign generation module 315. In particular, upon receiving an indication from the campaign generation module 315 that a particular advertising campaign has been approved, the campaign management module 320 initiates the advertising campaign. Specifically, the campaign management module 320 may request to receive advertising opportunities available for bidding from the advertising exchange system 115. Responsive to receiving an advertising opportunity, the campaign generation module 320 automatically determines whether to bid on the advertising opportunity based at least on how well the advertising opportunity matches the targeting parameters for the advertising campaign. For example, the campaign generation module 320 may only bid on an advertising opportunity if the advertising opportunity is associated with a particular advertising category indicated by the targeting parameters for the advertising campaign.

If the campaign management module 320 determines to proceed with a bid for the particular advertising opportunity, the campaign management module 320 determines a price for the bid. The price at which the campaign generation module 320 bids on the advertising opportunities can be based on any suitable criteria. For example, the campaign generation module 320 may price a bid based on the remaining amount to spend on the advertising campaign. As another example, the campaign generation module 320 may price a bid based on historical pricing information for similar bids previously submitted to the advertising exchange system 115.

If the campaign management module 320 wins a bid, the campaign module 320 generates an advertisement using the advertising creative for the advertising campaign. The advertisement may then be provided to the content provider 110 of the advertising opportunity associated with the bid. The advertisement may then be presented to a user of the content provider 110.

In one embodiment, during operation of the advertising campaign, the campaign management module 320 periodically generates reports for the advertising campaign. The reports may be provided to a user responsible for the third-party sales listing with which the advertising campaign is associated. The reports may include any suitable metrics for the advertising campaign and/or the third-party sales listing. For example, the campaign management module 320 may generate a report including the number of users exposed to or shown advertisements of the advertising campaign. The report may additionally include a number of times users clicked on the advertisements of the advertising campaign. The report may moreover include the number of users that viewed the third-party sales listing, a number of users that bid or offered to purchase an item, etc.

The metrics for the reports may be obtained in any suitable manner. In some instances, the metrics for the reports may be obtained from the advertising exchange system 115, the content provider 110, the third-party transactional system 108, and/or directly from a user device 105. For example, each time an advertisement of the advertising campaign is presented, a mechanism (e.g., a tracking pixel) embedded in the advertisement may provide information to the campaign management module 320 indicating that the advertisement has been viewed. As another example, the campaign management module 320 periodically polls the third-party transactional system 108 for data regarding the number of users that viewed the third-party sales listing.

In one aspect, the metrics may be structured and/or formatted in the reports in any suitable manner. For example, the metrics may be structured as a listing of raw numbers relating to the number of times advertisements of the advertising campaign were shown, relating to the number of bids associated with the third-party sales listing of the advertising campaign, etc. The metrics may be structured as various visual mechanisms, such as graphs and charts.

In one embodiment, the campaign management module 320 automatically updates the advertising creative for the advertising campaign over time. For example, the advertising creative may include one or more dynamic data items that may be updated or changed over time. In one aspect, the campaign management module 320 updates the information of the dynamic data items based on changes to the third-party sales posting. Illustratively, the advertising creative may include a current number of bids. The campaign management module 320 may update the current number of bids of the advertising creative over time to reflect the current number of bids associated with the third-party sales listing.

The campaign management module 320 may obtain the updates to the advertising creative by periodically polling the third-party transactional system 108 for updated information for the third-party sales listing. The campaign management module 320 may alternatively or additionally obtain updates to the advertising creative by being pushed such information by the third-party transactional system 108. As a specific example, the advertising creative may include a dynamic data item that includes information indicating a number of current offers for the item that is the subject of the third-party sales listing of the advertising campaign. The campaign management module 320 may obtain an updated count for the number of current offers by periodically performing an API call to the third-party transactional system 108.

Responsive to the updates, the campaign management module 320 updates the advertising creative stored by the campaign store 305. For example, the campaign management module 320 may access the campaign store 305 and change the advertising creative to indicate that the campaign currently has 20 bids. Thus, subsequent advertisements generated based on the advertising creative may be up to date with respect to the third-party sales listing.

In one embodiment, the campaign management module 320 automatically terminates or ends the advertising campaign based at least in part on the current status of the third-party sales listing. In one aspect, the campaign management module 320 terminates an advertising campaign following expiration of an active time period for the third-party sales listing. For example, the third-party sales listing may be active for a 4 day period. After the 4 day period ends, the third-party sales listing may automatically expire if the item offered by the third-party sales listing is not sold. Likewise, the advertising campaign may also end following the 4 day period. In another aspect, the campaign management module 320 automatically terminates after exhaustion of the amount authorized by the user of the user device 105 to spend on the advertising campaign. In yet another aspect, the campaign management module 320 periodically polls or is pushed information from the third-party transactional system 108 indicating whether the third-party sales listing has ended prior to the active time period set for the third-party sales listing. For example, the third-party sales listing may end if a single item offered by the third-party sales listing has been purchased prior to the end of the active time period for the third-party sales listing. Thus, based on an indication that the third-party sales listing has ended prior to the end of the active time period, the campaign management module 320 automatically terminates the advertising campaign.

Figure 4:
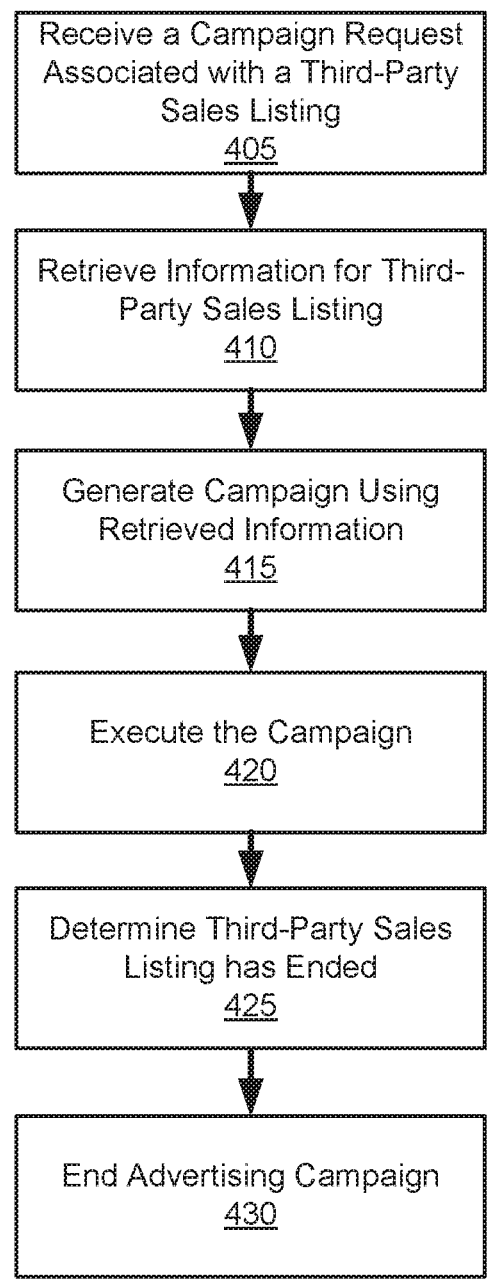
FIG. 4 is a flow chart illustrating a method for facilitating the generation and management an advertising campaign based on a third-party sales listing according to one embodiment.

Method for Facilitating the Generation and Management of an Advertising Campaign Based on a Third-Party Sales Listing FIG. 4 is a flowchart illustrating a method for facilitating generation and management of an advertising campaign based on a third-party sales listing according to one embodiment. Other embodiments can perform the steps of the method in different orders and can include different, additional and/or fewer steps. Likewise, multiple instances of the steps may be performed in parallel.

Figure 5A:
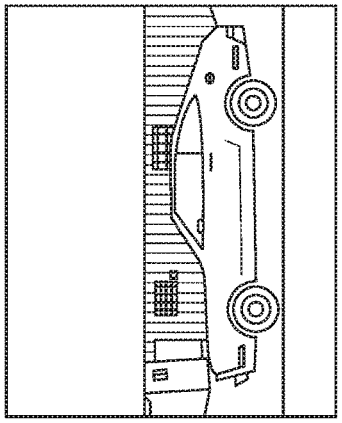
FIG. 5A is an example graphical user interface of a third-party sales listing including a button for generating an advertising campaign according to one embodiment.

In one embodiment, the method begins with the campaign system 120 receiving 405 a campaign request associated with a third-party sales listing. The request may be initiated by a user of the third-party transactional system 108 in any suitable manner. For example, referring to FIG. 5A, it shows an example graphical user interface of a third-party sales listing. The graphical user interface may enable a user responsible for the third-party sales listing to manage the third-party sales listing. As shown in FIG. 5A, the graphical user interface includes a button 505 allowing a user to initiate a campaign request. In particular, the user responsible for the third-party sales may click on the button to automatically initiate a transmission of a campaign request to the campaign system 120. The campaign request may include an identifier for the third-party transactional system 108 and/or an identifier for the third-party sales listing.

Figure 5B:
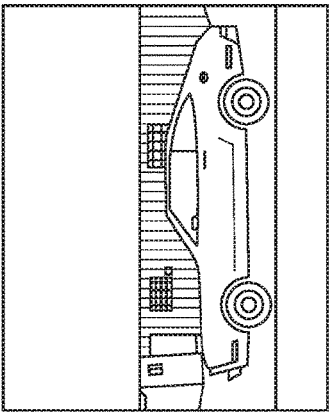
FIG. 5B is another example graphical user interface for previewing an advertising creative of a generated advertising campaign according to one embodiment.

Responsive to receiving the campaign request, the campaign system 120 retrieves 410 information for the third-party sales listing from the third-party transactional system 108 over which the third-party sales listing is posted. After retrieving the information, the campaign system 120 generates 415 an advertising campaign using the retrieved information. Specifically, the campaign system 120 generates an advertising creative for the campaign using the retrieved information. The campaign system 120 furthermore determines targeting parameters and/or other information for the advertising campaign. In one embodiment, information for the advertising campaign (e.g., the targeting parameters, advertising creative, etc.) may be provided for approval by the responsible user. Referring now to FIG. 5B, it shows an example graphical user interface presented to the user that includes a preview of the generated advertising creative for the advertising campaign. As shown in FIG. 5B, the generated advertising creative is based on the third-party sales listing illustrated in FIG. 5A. Illustratively, the image used for the advertising creative and certain specifics included in the advertising creative are directly obtained from the third-party sales listing. As shown in FIG. 5B, the graphical user interface includes a button 510 for modifying or updating the advertising creative. Referring now to FIG. 5C, it shows an example graphical user interface presented to the user that includes various details regarding the generated advertising campaign. Such details include the estimated reach for the advertising campaign, the recommended amount to be spent on the campaign, the end date of the campaign corresponding to the end date of the third-party sales listing, and targeting parameters for the campaign. As shown, a user may approve the campaign by clicking on the approve button 515.

After receiving an approval of the generated advertising campaign, the campaign system 120 executes 420 the advertising campaign. In particular, the campaign system 120 bids on advertising opportunities auctioned by an advertising exchange system 115. Responsive to a winning bid, the campaign system 120 provides an advertisement based on the generated advertising creative to the advertising exchange system 115 and/or the content provider 110 for presentation to a user.

During execution of the advertising campaign, the campaign system 120 determines 425 that the third-party sales listing associated with the generated campaign has ended. The campaign system 120 may make such a determination in any suitable manner. For example, the campaign system 120 periodically polls the third-party transactional system 108 for status information regarding the third-party sales listing. Responsive to receiving an indication that the third-party sales listing has ended, the campaign system ends 430 the advertising campaign.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:
1. A computer-implemented method comprising:
receiving a campaign request, the campaign request comprising an identifier associated with a sales listing of a single item offered for sale online through a third-party service;
responsive to receiving the campaign request, automatically generating an online advertising campaign at the advertising campaign system by:
retrieving sales listing data for the sales listing using the received identifier, the retrieved sales listing data comprising a retrieved price associated with the single item;
generating an advertising creative using the retrieved sales listing data for the sales listing; and
calculating a recommended campaign budget of the advertising campaign based on the retrieved price associated with the single item;

bidding, by the advertising campaign system, on an advertising opportunity in a rapid auction at an online advertising exchange according to the generated advertising campaign; and responsive to winning the auction, providing an advertisement based on the advertising creative to a content provider associated with the advertising opportunity.

2. The computer-implemented method of claim 1, further comprising:

receiving updated sales listing data for the sales listing comprising a number of offers associated with the sales listing;

modifying the advertising creative based on the updated sales listing data, the modified advertising creative including the number of offers associated with the sales listing;

bidding on an additional advertising opportunity in an additional auction according to the advertising campaign; and responsive to winning the additional auction, providing an advertisement based on the modified advertising creative to a content provider associated with the additional advertising opportunity.

3. The computer-implemented method of claim 1, wherein bidding on the advertising opportunity comprises:

identifying an item shipment restriction associated with the sales listing; and bidding on the advertising opportunity based on the item shipment restriction, wherein bidding on the advertising opportunity based on the item shipment restrictions comprises:

determining a first location indicated by the sales listing data;

determining a second location associated with the advertising opportunity;

determining that the first location is within a threshold distance of the second location; and bidding on the advertising opportunity based at least in part on determining that the first location is within a threshold distance of the second location.

4. The computer-implemented method of claim 1, wherein the sales listing is at least one of: an online auction listing, an online rental listing, an online job listing, or an online classifieds listing.

5. The computer-implemented method of claim 1, wherein automatically generating an online advertising campaign comprises:

identifying a sales listing category indicated in the sales listing data;

mapping the sales listing category to an advertising category of an advertising exchange system; and generating a targeting parameter for the advertising campaign based on the mapping of the sales listing category to the advertising category of the advertising exchange system.

6. The computer-implemented method of claim 1, further comprising:

receiving information indicating that the sales listing of the single item offered for sale online through the third-party service has ended due to a purchase of the single item; and terminating the advertising campaign based on receiving the information indicating that the sales listing of the single item offered for sale online through the third-party service has ended due to a purchase of the single item.

7. The computer-implemented method of claim 1, wherein automatically generating the online advertising campaign comprises:

identifying one or more sales categories associated with sales listing and indicated by the sales listing data; and determining a set of user demographics based on the one or more sales categories; and wherein the bidding on an advertising opportunity is based at least in part on the determined set of user demographics based on the one or more sales categories associated with the sales listing.

8. A non-transitory computer readable storage medium executing computer program instructions, the computer program instructions comprising instructions for:

receiving a campaign request, the campaign request comprising an identifier associated with a sales listing of a single item offered for sale online through a third-party service;

responsive to receiving the campaign request, automatically generating an online advertising campaign at the advertising campaign system by:

retrieving sales listing data for the sales listing using the received identifier, the retrieved sales listing data comprising a retrieved price associated with the single item;

generating an advertising creative using the retrieved sales listing data for the sales listing; and calculating a recommended campaign budget of the advertising campaign based on the retrieved price associated with the single item;

bidding, by the advertising campaign system, on an advertising opportunity in a rapid auction at an online advertising exchange according to the generated advertising campaign; and responsive to winning the auction, providing an advertisement based on the advertising creative to a content provider associated with the advertising opportunity.

9. The non-transitory computer readable storage of claim 8, wherein the instructions further comprise instructions for:

receiving updated sales listing data for the sales listing comprising a number of offers associated with the sales listing;

modifying the advertising creative based on the updated sales listing data, the modified advertising creative including the number of offers associated with the sales listing;

bidding on an additional advertising opportunity in an additional auction according to the advertising campaign; and responsive to winning the additional auction, providing an advertisement based on the modified advertising creative to a content provider associated with the additional advertising opportunity.

10. The non-transitory computer readable storage of claim 8, wherein the instructions for bidding on the advertising opportunity comprise instructions for:

identifying an item shipment restriction associated with the sales listing; and bidding on the advertising opportunity based on the item shipment restriction, wherein the instructions for bidding on the advertising opportunity based on the item shipment restrictions comprise instructions for:

determining a first location indicated by the sales listing data;

determining a second location associated with the advertising opportunity;

determining that the first location is within a threshold distance of the second location; and bidding on the advertising opportunity based at least in part on determining that the first location is within a threshold distance of the second location.

11. The non-transitory computer readable storage of claim 8, wherein the sales listing is at least one of: an online auction listing, an online rental listing, an online job listing, or an online classifieds listing.

12. The non-transitory computer readable storage of claim 8, further comprising instructions for:

receiving information indicating that the sales listing of the single item offered for sale online through the third-party service has ended due to a purchase of the single item; and terminating the advertising campaign based on receiving the information indicating that the sales listing of the single item offered for sale online through the third-party service has ended due to a purchase of the single item.

13. A system comprising:

a processor; and a computer readable storage medium storing processor-executable computer program instructions, the instructions comprising instructions for:

receiving a campaign request, the campaign request comprising an identifier associated with a sales listing of a single item offered for sale online through a third-party service;

responsive to receiving the campaign request, automatically generating an online advertising campaign at the advertising campaign system by:

retrieving sales listing data for the sales listing using the received identifier, the retrieved sales listing data comprising a retrieved price associated with the single item;

generating an advertising creative using the retrieved sales listing data for the sales listing; and calculating a recommended campaign budget of the advertising campaign based on the retrieved price associated with the single item;

bidding, by the advertising campaign system, on an advertising opportunity in a rapid auction at an online advertising exchange according to the generated advertising campaign; and responsive to winning the auction, providing an advertisement based on the advertising creative to a content provider associated with the advertising opportunity.

14. The system of claim 13, wherein the computer instructions further comprise instructions for:

receiving updated sales listing data for the sales listing comprising a number of offers associated with the sales listing;

modifying the advertising creative based on the updated sales listing data, the modified advertising creative including the number of offers associated with the sales listing;

bidding on an additional advertising opportunity in an additional auction according to the advertising campaign; and responsive to winning the additional auction, providing an advertisement based on the modified advertising creative to a content provider associated with the additional advertising opportunity.

15. The system of claim 13, wherein the instructions for bidding on the advertising opportunity comprise instructions for:

identifying an item shipment restriction associated with the sales listing; and bidding on the advertising opportunity based on the item shipment restriction, wherein the instructions for bidding on the advertising opportunity based on the item shipment restrictions comprise instructions for:

determining a first location indicated by the sales listing data;

determining a second location associated with the advertising opportunity;

determining that the first location is within a threshold distance of the second location; and bidding on the advertising opportunity based at least in part on determining that the first location is within a threshold distance of the second location.

16. The system of claim 13, wherein the sales listing is at least one of: an online auction listing, an online rental listing, an online job listing, or an online classifieds listing.

17. The system of claim 13, wherein the instructions further comprise instructions for:

receiving information indicating that the sales listing of the single item offered for sale online through the third-party service has ended due to a purchase of the single item; and terminating the advertising campaign based on receiving the information indicating that the sales listing of the single item offered for sale online through the third-party service has ended due to a purchase of the single item.

* * * * *